(No Model.)

M. M. JONES.
WIRE CRIMPER.

No. 296,177. Patented Apr. 1, 1884.

Witnesses:
T. Walter Fowler
H. B. Applewhaite

Inventor
Matthew M. Jones
per attys.
A. H. Evans &Co.

UNITED STATES PATENT OFFICE.

MATTHEW M. JONES, OF KOKOMO, INDIANA.

WIRE-CRIMPER.

SPECIFICATION forming part of Letters Patent No. 296,177, dated April 1, 1884.

Application filed October 8, 1883. (No model.)

*To all whom it may concern:*

Be it known that I, MATTHEW M. JONES, of Kokomo, in the county of Howard and State of Indiana, have invented a new and useful Improvement in Wire-Crimpers, of which the following is a full, clear, and exact description, reference being had to the accompanying drawings, making a part of this specification, in which—

Figure 1:
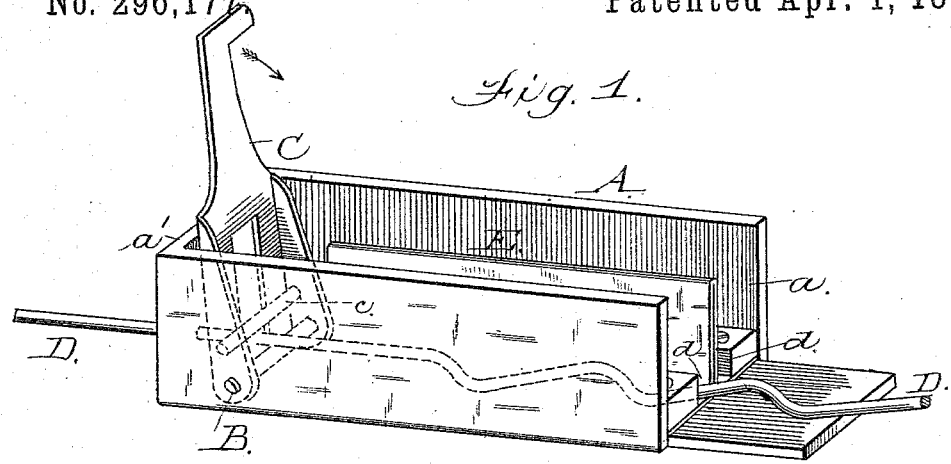
Figure 2:
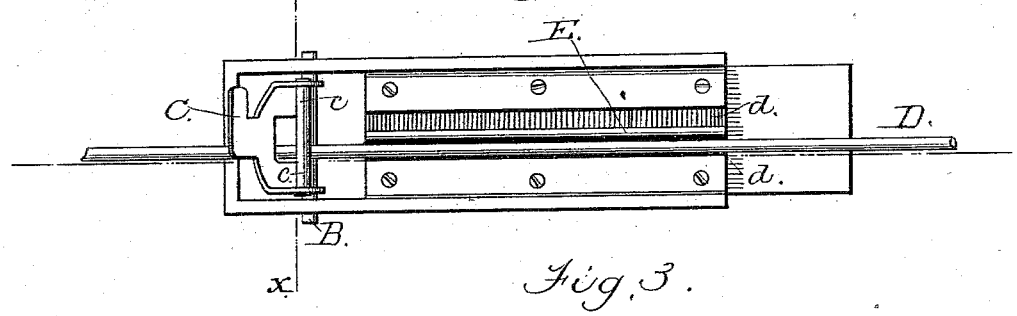
Figure 3:
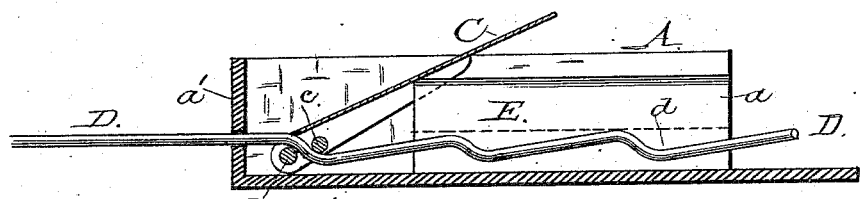
Figure 4:
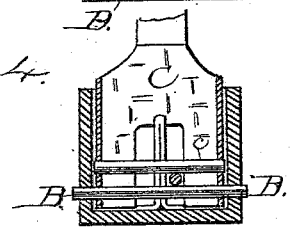
Figure 5:
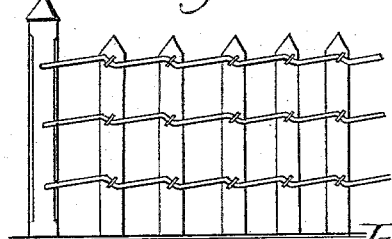

Figure 1 is a perspective view of my invention. Fig. 2 is a plan view of the same. Fig. 3 is a longitudinal section. Fig. 4 is a transverse section through $x$ $x$ of Fig. 2. Fig. 5 shows the practical application of the wire.

My invention relates to devices for crimping wire for use in constructing picket and other fences; and it consists in the combination of devices hereinafter explained and claimed.

To enable others skilled in the art to make and use my invention, I will proceed to describe the exact manner in which I have carried it out.

In the drawings, A represents a trough-shaped box having the rear end, $a$, open, and the forward end, $a'$, closed, but perforated for the passage of the wire, as shown in Fig. 1. Near the forward end of the box is the transverse bar B, on which is pivoted the lever-handle C. This handle is bifurcated and is provided with a cross-bar, $c$, as shown in Fig. 4. When the handle is in position and pivoted in the box A by the transverse bar B, there is just space enough between the bars B and $c$ to allow of the free passage of the wire D when the lever-handle C stands in a vertical position, as shown in Fig. 2. It is now evident that if the lever-handle be forced down, as shown in Fig. 3, the wire D will be crimped, as also shown in the same figure. In the rear of the lever-handle the box may be divided longitudinally by the septum E, with a view to operating on two wires at the same time. The box may be made to accommodate any desired number of wires. In each division of the box I provide the crimp-guards $d$ $d$, for holding the crimped wire steadily in position, so that the crimps, when made, shall all lie in the same vertical plane, as shown in Fig. 5.

Having thus explained my invention, what I claim as new, and desire to secure by Letters Patent, is—

1. In a wire-crimper, the box A, having its front end closed and perforated for the free passage of the wire, and provided with the transverse bar B, in combination with the hinged or pivoted lever-handle C, bifurcated at its lower end and provided with the transverse cross-bar $c$, all constructed to operate substantially as and for the purpose set forth.

2. The box A, provided with the transverse bar B, in combination with the bifurcated lever-handle C, provided with the cross-bar $c$, and the crimp-guards $d$ $d$, substantially as and for the purpose set forth.

MATTHEW M. JONES.

Witnesses:
J. C. BLACKLIDGE,
B. C. H. MOON.